US009208697B2

(12) United States Patent
Nagata et al.

(10) Patent No.: US 9,208,697 B2
(45) Date of Patent: Dec. 8, 2015

(54) INFORMATION DISPLAY DEVICE, INFORMATION DISPLAY METHOD, AND PROGRAM

(75) Inventors: Satoshi Nagata, Tokyo (JP); Toshitake Mashiko, Tokyo (JP); Hiroaki Akiyama, Tokyo (JP); Yuichi Ueda, Tokyo (JP); Yutaka Nakatsu, Tokyo (JP); Tsuyoshi Moriai, Chiba (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 13/406,631

(22) Filed: Feb. 28, 2012

(65) Prior Publication Data

US 2012/0249455 A1 Oct. 4, 2012

(30) Foreign Application Priority Data

Mar. 29, 2011 (JP) ................................. 2011-073047

(51) Int. Cl.
G09B 29/10 (2006.01)
G06F 3/0488 (2013.01)
G06Q 30/02 (2012.01)
G09B 29/00 (2006.01)
G06F 3/0484 (2013.01)
G06F 3/0481 (2013.01)

(52) U.S. Cl.
CPC .............. *G09B 29/10* (2013.01); *G06F 3/0488* (2013.01); *G06F 3/04812* (2013.01); *G06F 3/04842* (2013.01); *G06Q 30/0261* (2013.01); *G09B 29/007* (2013.01); *G06F 2203/04801* (2013.01)

(58) Field of Classification Search
CPC ................ G06F 3/017; G06F 3/04815; G06F 17/30873; G06F 222/2111

USPC ............ 345/156, 594; 455/456.3, 456.1, 457; 705/14.58

See application file for complete search history.

(56) References Cited

U.S. PATENT DOCUMENTS

| 2009/0178007 A1* | 7/2009 | Matas et al. .................. 715/835 |
| 2010/0281435 A1 | 11/2010 | Bangalore et al. |
| 2010/0309149 A1 | 12/2010 | Blumenberg et al. |
| 2010/0318573 A1 | 12/2010 | Yoshikoshi |

FOREIGN PATENT DOCUMENTS

| JP | 08-029186 | 2/1996 |
| JP | 10-096648 | 4/1998 |
| JP | 2005-083941 | 3/2005 |
| JP | 2007-086633 | 4/2007 |
| JP | 2009-111856 | 5/2009 |

(Continued)

OTHER PUBLICATIONS

Dec. 4, 2014, JP communication issued for related JP application No. 2011-073047.

*Primary Examiner* — Amare Mengistu
*Assistant Examiner* — Shawna Stepp Jones
(74) *Attorney, Agent, or Firm* — Paratus Law Group, PLLC (57) ABSTRACT

A method is provided for displaying information. The method comprises displaying, on a touch screen, at least one representation of a geographic location. The method further comprises detecting contact between an operating member and a position on the touch screen; and displaying, based on the detected contact, information associated with the geographic location. The method still further comprises detecting removal of the operating member from the touch screen; and maintaining display of the geographic location information after detection of the removal.

21 Claims, 6 Drawing Sheets (56) References Cited  * cited by examiner

FOREIGN PATENT DOCUMENTS

| | | |
|---|---|---|
| JP | 2009-518752 | 5/2009 |
| JP | 2010-271982 | 12/2010 |
| WO | WO2009/016736 A1 | 7/2007 |

INFORMATION DISPLAY DEVICE, INFORMATION DISPLAY METHOD, AND PROGRAM

CROSS-REFERENCE TO RELATED APPLICATION

This application claims priority of Japanese Patent Application No. 2011-073047, filed on Mar. 29, 2011, the entire content of which is hereby incorporated by reference.

BACKGROUND

The present technology relates to an information display device, an information display method, and a program. Especially, the present technology relates to an information display device, an information display method, and a program by which information can be provided with a more comfortable operation.

In related art, a service to display an electrical map of the vicinity of a current position and to display marks showing positions of various kinds of commercial facilities and public facilities around the current position has been provided to a notebook-sized personal computer.

For example, Japanese Unexamined Patent Application Publication No. 2009-111856 discloses a terminal device which roughly displays a direction and a distance from a current position to a destination so as to enable a user to easily grasp the direction and the distance to the destination.

SUMMARY

In recent years, portable information terminals on which a touch panel is mounted (so-called smartphone and the like) have been widely used and various kinds of services have been provided to smartphones. However, a user interface of related art which is employed in a notebook-sized personal computer is designed on the assumption that the interface is operated by using a pointing, device such as a mouse. Therefore, even if the user interface of the related art is directly applied to smartphones, it is difficult to comfortably operate smartphones which are designed on the assumption that they are operated through a touch panel.

It is desirable to enable provision of information by a more comfortable operation.

Accordingly, there is provided a method for displaying information. The method comprises displaying, on a touch screen, at least one representation of a geographic location. The method further comprises detecting contact between an operating member and a position on the touch screen; and displaying, based on the detected contact, information associated with the geographic location. The method still further comprises detecting removal of the operating member from the touch screen; and maintaining display of the geographic location information after detection of the removal.

In a second aspect, there is provided an apparatus. The apparatus comprises a memory and a processor executing instructions stored in the memory to generate signals for displaying, on a touch screen, at least one representation of a geographic location. The processor further executes instructions stored in the memory to detect contact between an operating member and a position on the touch screen; and generate signals for displaying, based on the detected contact, information associated with the geographic location. The processor still further executes instructions stored in the memory to detect removal of the operating member from the touch screen; and maintain display of the geographic location information after detection of the removal.

In a third aspect, there is provided a non-transitory, computer-readable storage medium storing instructions which, when executed by a computer, perform a method of displaying information, the method comprising displaying, on a touch screen, at least one representation of a geographic location. The method further comprises detecting contact between an operating member and a position on the touch screen; and displaying, based on the detected contact, information associated with the geographic location. The method still further comprises detecting removal of the operating member from the touch screen; and maintaining display of the geographic location information after detection of the removal.

According to the embodiments of the present technology, information can be provided with a more comfortable operation.

DETAILED DESCRIPTION OF EMBODIMENTS

An embodiment of the present technology is now described in detail with reference to the accompanying drawings.

Figure 1:
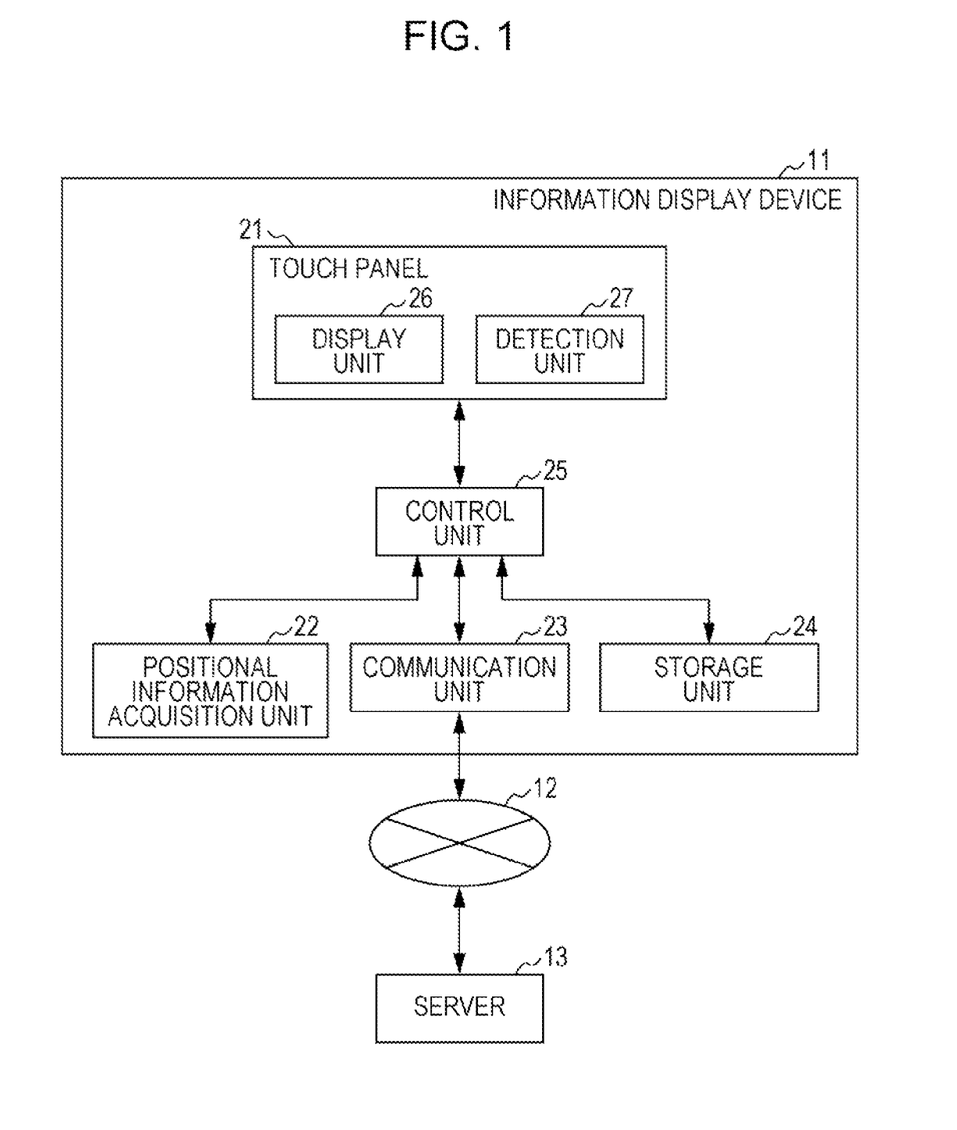
FIG. 1 is a block diagram showing a configuration example of an information display device according to an embodiment of the present technology.

FIG. 1 is a block diagram showing a configuration example of an information display device according to the embodiment of the present technology.

An information display device 11 shown in FIG. 1 communicates with a server 13 which provides various types of information, via a network 12 and displays information in response to user's operation.

The information display device 11 includes a touch panel 21, a positional information acquisition unit (i.e., a software module, a hardware module, or a combination of a software module and a hardware module) 22, a communication unit 23, a storage unit 24, and a control unit 25.

The touch panel 21 is composed of a display unit 26 which includes a liquid crystal display or an organic electro luminescence (EL), for example, and a detection unit 27 which has a detection function of a resistance film type, a capacitance type, an infrared type, or the like.

The display unit 26 displays various types of information which are provided to a user and a graphical user interface (GUI) which is used for user's operation, in accordance with control of the control unit 25. The detection unit 27 detects a position on which the user touches (contacts) with respect to a surface of the display unit 26 and specifies the touch position so as to supply coordinate information showing the touch position to the control unit 25.

The positional information acquisition unit 22 acquires information for specifying a current position of the information display device 11 by using a global positioning system (GPS) or a wireless local area network (LAN), for example. Specifically, the positional information acquisition unit 22 specifies a current position of the information display device 11 by a trilateration method based on positional information of three base stations, by using radio waves transmitted from three base stations which are placed on at least separate positions.

The communication unit 23 performs data communication in accordance with a radio communication standard which is used in a mobile telephone and requests the server 13 to transmit information via the network 12 such as Internet so as to acquire information provided from the server 13. For example, the server 13 provides information of a predetermined spot existing around the current position of the information display device 11 such as information of a spot on which there is a commercial facility, a public facility, or the like, for example (arbitrarily referred to below as a spot). Information of a spot (i.e., a geographic location) includes positional information of the spot, a name of the spot, an address of the spot, and the like.

The storage unit 24 includes a nonvolatile semiconductor memory such as a flash memory (for example, electronically erasable and programmable read only memory (EEPROM)) in which a content is saved even if the device is powered down. The storage unit 24 stores a program (application software) to be executed by the control unit 25, database in which information acquired by the communication unit 23 is registered, and the like, for example.

The control unit 25 includes a central processing unit (CPU), a read only memory (ROM) (i.e., non-transitory, computer-readable storage medium), a random access memory (RAM), and the like, and loads a program (i.e., instructions) stored in the ROM or the storage unit 24 to the RAM and executes the program so as to control respective units of the information display device 11. Here, a program executed by the CPU may be preliminarily stored in the ROM or the storage unit 24 and may be arbitrarily downloaded on the storage unit 24 and updated.

For example, the control unit 25 executes a program for displaying a positional relationship of spots existing around the current position on the touch panel 21. The control unit 25 allows the positional information acquisition unit 22 to acquire information for specifying a current position of the information display device 11 in accordance with the program and requests information of spots existing around the current position of the information display device 11 via the communication unit 23. When the server 13 provides information of spots existing around the current position of the information display device 11 in response to this request, the control unit 25 allows the touch panel 21 to display a screen in which marks corresponding to positional information of these spots are arranged.

Figure 2:
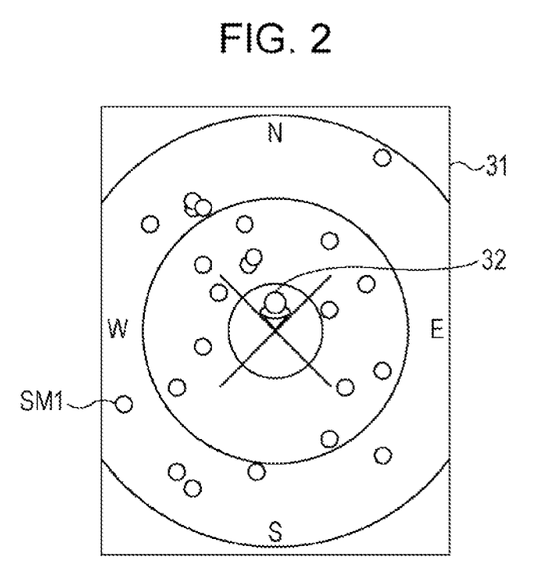
FIG. 2 illustrates a display example of a screen displayed on a touch panel.

FIG. 2 illustrates a display example of a screen which is displayed on the touch panel 21 when the control unit 25 executes a program for displaying a positional relationship of spots existing around the current position.

As shown in FIG. 2, a central mark 32 (i.e., a graphic) showing the current position of the information display device 11 (i.e., a device location) is displayed on the center of a screen 31 (i.e., a touch screen). Here, in the embodiment of the present technology, a display example of information which is acquired by taking the current position of the information display device 11 as the center is described. However, the current position of the information display device 11 can be moved from the center of the screen 31 or information acquired by taking a position which is obtained as a result of keyword detection or a registered position as a center can be displayed.

On the screen 31, a plurality of circles or arcs of which diameters are different from each other are displayed around the central mark 32 in a concentric fashion. These circles or arcs (i.e., distance information) represent distances from the current position in a manner to follow a predetermined scale. Further, on the screen 31, symbols of "N", "S", "E", and "W" representing directions are displayed on respective central parts of an upper side, a lower side, a right side, and a left side, representing that the upside of the screen 31 shows a north direction. The directions are displayed on the screen 31 in such manner that a direction to which a user faces is constantly the upside, and display of the symbols of "N", "S", "E", and "W" representing directions (i.e., direction information) corresponds to the direction to which the user faces. That is, in a case where the user faces east direction, the symbol "E" representing the east direction is displayed on the upside of the screen 31.

Further, on the screen 31, marks arranged in accordance with the positional information of spots existing around the current position of the information display device 11 are displayed by circular marks in a manner to set the current position of the information display device 11 as a center. Thanks to the marks showing the positional relationship of the spots (arbitrarily referred to below as spot marks SM), the user can easily recognize' brief distances and directions of these spots.

For example, when an interval between circles or arcs displayed on the screen 31 represents a distance of 250 m, a spot mark SM1 (i.e., a representation of a geographic location) existing near the left side of the screen 31 represents a spot positioned on a place which is away from the current position by approximately 700 m in about west-southwest direction.

Further, in the information display device 11, when it is detected that a user touches a display part of a spot mark SM on the screen 31 displayed on the touch panel 21, basic information of the spot mark SM is displayed on the screen 31.

Figure 3:
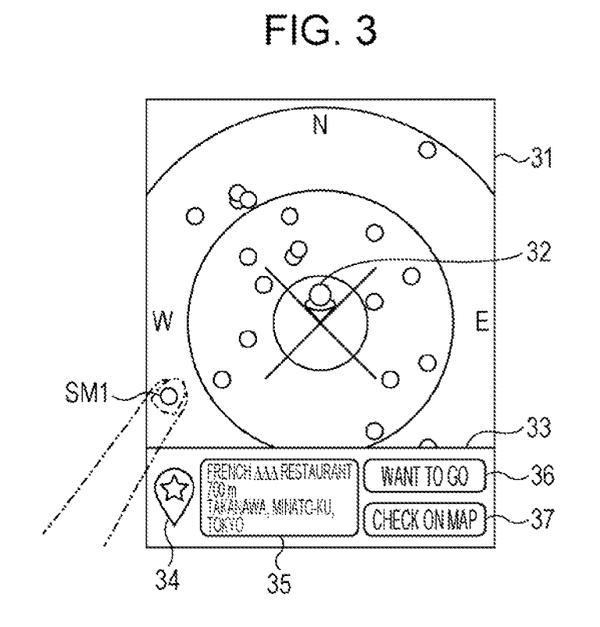
FIG. 3 illustrates a display example at a time when a user touches a spot mark.

FIG. 3 illustrates a display example of a screen which is displayed on the touch panel 21 when a user touches the display part of the spot mark SM1.

In FIG. 3, a finger of the user (i.e., an operating member) is shown by a two-dot chain line. When the user touches the display part of the spot mark SM1, a basic information display part 33 for displaying basic information of the spot mark SM1 is displayed on the downside of the screen 31.

In the basic information display part 33 (i.e., a portion of the touch screen), a type icon 34, a text display part 35, and GUI buttons 36 and 37 (i.e., an input area) are displayed.

The type icon 34 is used for discriminating a type of information of a spot (i.e., an information category) specified by a spot mark SM, by changing colors, for example. Examples of information of a spot include word-of-mouth information of the spot which is registered by unspecified people, official information which is registered by people related to the spot, self-produced information of the spot which is registered by the user. The type icon 34 is displayed by a blue color when a type of information of a spot mark SM selected by the user is word-of-mouth information, is displayed by a red color when the type of information of the spot mark SM is official information, and is displayed by a green color when the type of the information is self-produced information, for example.

The text display part 35 is a display region for displaying basic text information of a spot specified by a spot mark SM. In the display example of FIG. 3, information of the spot specified by the spot mark SM1 is displayed on the text display part 35 such that a name of the spot is "French ΔΔΔ restaurant", a distance from the current position is "700 m", and an address is "Takanawa, Minato-ku, Tokyo".

The GUI buttons 36 and 37 are GUI parts for driving respectively-assigned functions, for example, functions for displaying detailed information of the spot, in response to a touch operation of the user. For example, "want to go" is displayed on the GUI button 36. When the user touches the GUI button 36, a function for displaying a route to a spot (i.e., an image), of which basic information is displayed on the basic information display part 33, is run, for example. Further, "check on map" is displayed on the GUI button 37. When the user touches the GUI button 37, a function for displaying an electrical map (i.e., an image) which displays the spot, of which the basic information is displayed on the basic information display part 33, as a center is run.

Further, when the user moves (slides) his/her finger while touching the screen 31, basic information of a spot mark SM which is displayed on a part which is newly touched due to the movement is displayed on the basic information display part 33. Here, even in the case where the user moves (slides) his/her finger which touches the screen 31, a display position of the spot mark SM is kept to be fixed.

Figure 4:
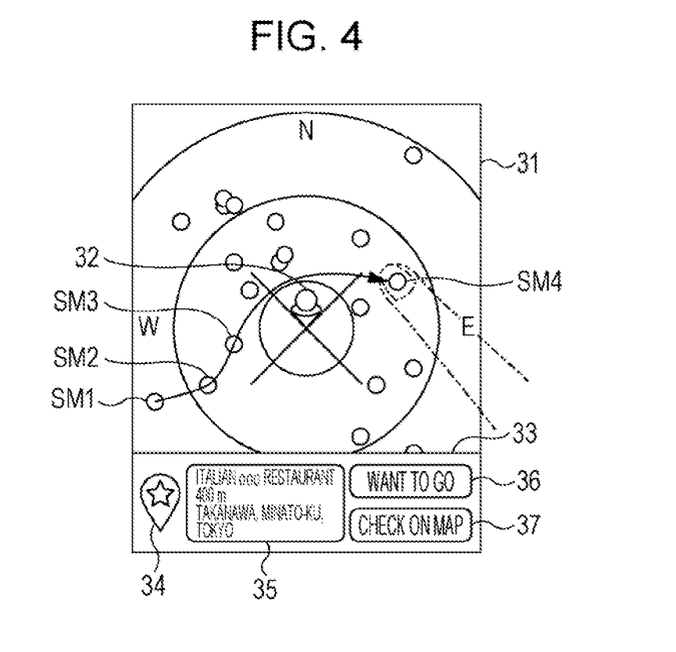
FIG. 4 illustrates a display example at a time when the user moves a touch position.

FIG. 4 illustrates a display example of a screen which is displayed on the touch panel 21 when a user moves a touch position.

In FIG. 4, a trajectory of movement of a touch position by a user is expressed by an arrow. That is, it is shown that the user moves the touch position while touching respective display parts of the spot mark SM1, a spot mark SM2, a spot mark SM3, and a sport mark SM4 in this order.

In the case where the touch position is moved as above, basic information of the spot mark SM2, basic information of the spot mark SM3, and basic information of the spot mark SM4 are sequentially displayed on the basic information display part 33 of the screen 31 in accordance with the movement. When the user touches the spot mark SM4 as the finger expressed by a two-dot chain line in FIG. 4, information of a spot specified by the spot mark SM4 is displayed on the text display part 35 of the basic information display part 33 such that a name of the spot is "Italian ooo restaurant", a distance from the current position is "400 m", and an address is "Takanawa, Minato-ku, Tokyo".

It is assumed that the user releases his/her finger which has been touching the touch panel 21, when the basic information of the spot specified by the spot mark SM4 is displayed on the basic information display part 33.

Figure 5:
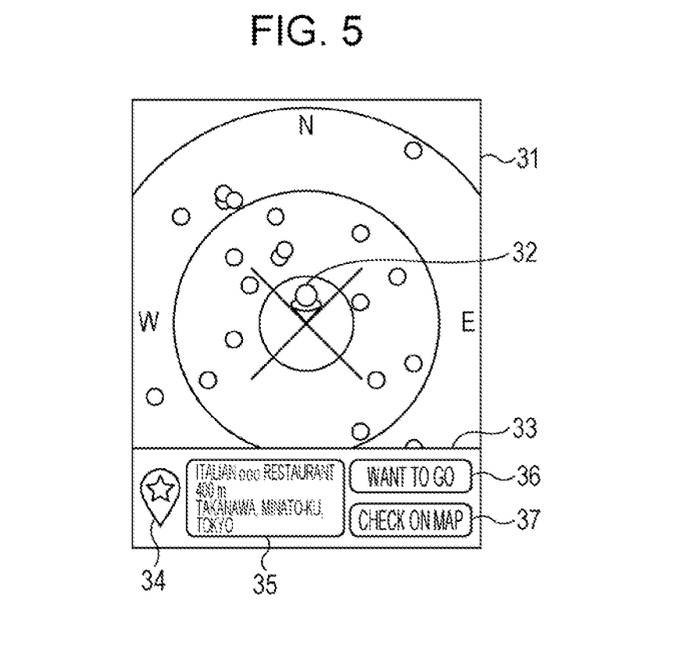
FIG. 5 illustrates a display example at a time when the user releases a touch.

At this time, as shown in FIG. 5, the display of the basic information of the spot specified by the spot mark SM4 which has been touched last is maintained. That is, in the information display device 11, display control is performed so that the basic information which has been displayed on the basic information display part 33 of the screen 31 when the user releases his/her finger is kept displayed.

Accordingly, the user can perform such operation that the user updates the display of the basic information display part 33 by moving the touch position, and when the user gets interested in basic information of a spot displayed on the basic information display part 33, the user releases his/her finger from the touch panel 21 and touches the GUI button 36 or 37 of the basic information display part 33.

For example, when a user releases his/her finger from the touch panel 21, a touch position is not detected, so that it can be assumed that display control for returning to a state that the spot mark SM is not selected as shown in FIG. 2 is performed. However, it is considered that it takes time for the user to perform an operation for displaying detailed information of an interested spot by such display control.

In contrast, thanks to the display control for maintaining the display of the basic information displayed on the basic information display part 33 of the screen 31 even when the user releases his/her finger from the touch panel 21, detailed information of the spot can be displayed by touching the GUI button 36 or 37 of the basic information display part 33. That is, the user can display detailed information of the interested spot by more intuitive and smoother operation.

Namely, the information display device 11 can provide information to a user by such more comfortable operation that the user releases his/her finger from the touch panel 21 when basic information of his/her interested spot is displayed on the basic information display part 33 and touches the GUI button 36 or 37 of the basic information display part 33.

Here, in a personal computer, for example, such user interface is employed that a cursor is overlapped with a spot (mouseover) by using a pointing device such as a mouse so as to display basic information and detailed information is displayed in accordance with an operation of the click of the mouse. Even if such user interface is directly applied to the information display device 11, it is difficult to make a user to perform an operation corresponding to a click after basic information is displayed by touch because processing corresponding to the mouseover is not expected in the operation with a touch panel.

In contrast, in the information display device 11, the basic information display part 33 is continued to be displayed even after touch is released as described above, so that detailed information can be displayed by an operation of touching the GUI button 36 or 37 displayed on the basic information display-part 33, instead of an operation corresponding to a click.

Here, the basic information display part 33 is displayed on the downside of the screen 31 in the display examples of FIGS. 3 to 5. However, the basic information display part 33 may be displayed any part as long as the basic information display part 33 is displayed on one part of the screen 31 and may be displayed on the upside of the screen 31, for example. In the case where the basic information display part 33 is displayed on the upside of the screen 31, it is prevented that the basic information display part 33 is hidden by user's finger, being able to make the view of information displayed on the basic information display part 33 easy. In the case where the basic information display part 33 is displayed on the downside of the screen 31, the GUI buttons 36 and 37 are displayed near the user, so that an operation with respect to the GUI buttons 36 and 37 can be easily performed.

Here, in a case where the information display device 11 is a small-sized smartphone, the screen 31 is small. Therefore, when a plurality of spot marks SM are congested, these spot marks SM are displayed in an overlapped manner. Accordingly, it can be presumed that a user considers that only one spot mark SM is displayed even though a plurality of spot marks SM are displayed on the screen 31.

In the information display device 11, color strength (i.e., saturation) of spot marks SM displayed on the screen 31 can be adjusted in accordance with density of the spot marks SM. For example, the control unit 25 performs display control so that the spot marks SM are displayed in strong colors when the density of the spot marks SM is high, and the spot marks SM are displayed in weak colors when the density of the spot marks SM is low.

Concretely, the control unit 25 displays a spot mark SM by a translucent color, and when spot marks SM are overlapped with each other, the control unit 25 adjusts color strength of display of the spot marks SM by using a feature that spots marks SM are displayed in a manner that transparency is lowered.

Figure 6:
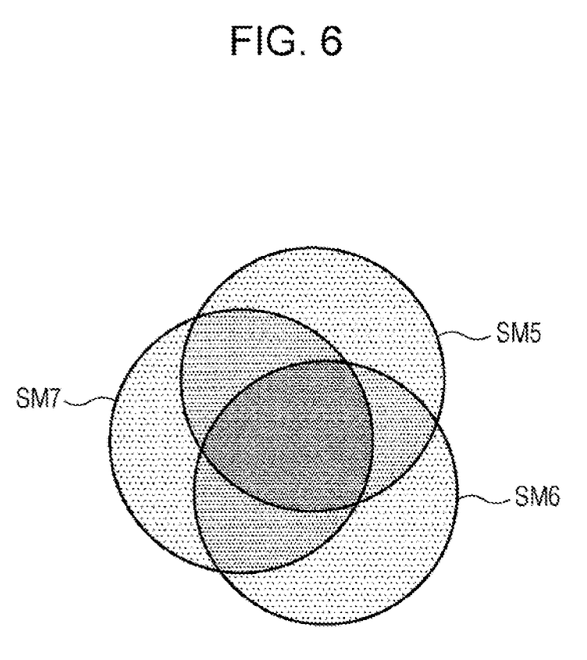
FIG. 6 illustrates a display example in which three spot marks are displayed in an overlapped manner.

FIG. 6 illustrates a display example that three spot marks SM5 to SM7 are displayed in an overlapped manner.

In the display example of FIG. 6, parts on which spot marks SM5 to SM7 are not overlapped with each other are displayed in strength which is used when the respective spot marks SM5 to SM7 are separately displayed. A part on which the spot marks SM5 and SM6 are overlapped with each other, a part on which the spot marks SM6 and SM7 are overlapped with each other, and a part on which the spot marks SM5 and SM7 are overlapped with each other are displayed in double strength of the strength used when the spots marks SM5 to SM7 are separately displayed. Further, a part on which the spot marks SM5 to SM7 are overlapped with each other is displayed in triple strength of the strength used when the spots marks SM5 to SM7 are separately displayed.

Thus, strength of display is adjusted in accordance with density of spot marks SM, so that the user can easily recognize the density of the spot marks SM by looking at the screen 31. Accordingly, even if a plurality of spot marks SM are displayed in an overlapped manner, the information display device 11 can securely make the user recognize that the plurality of spot marks SM are displayed.

Here, it can be presumed that it is difficult to select each of spot marks SM when a plurality of spot marks SM are densely displayed.

For example, in the information display device 11, the control unit 25 determines a position in displaying a spot mark SM on the screen 31 (coordinate position on the screen 31) based on information of a spot acquired by the communication unit 23. Further, the control unit 25 sets a circular region having a predetermined diameter as a determination region which is determined as a region on which the user touches the spot mark SM, by taking the coordinate position of the spot mark SM as a center. Then, the control unit 25 determines that the user has selected the spot specified by the spot mark SM which is determined to include the touch position of the user within its determination region, and displays basic information of the spot on the basic information display part 33.

At this time, if a plurality of spot marks SM are congested, determination regions set for respective spot marks SM are overlapped with each other. In such case, the control unit 25 can set determination regions so that a spot of which information is later acquired is preferentially selected, in accordance with an order that the communication unit 23 acquires information, for example. Accordingly, when a plurality of determination regions are overlapped with each other, an area of a determination region of a spot of which information is previously acquired is smaller than an area of a determination region of a spot of which information is later acquired. Therefore, it becomes hard to select a spot mark SM of the spot of which the information is previously acquired.

Accordingly, the information display device 11 performs processing for adjusting areas of determination regions so as to facilitate selection of respective spot marks SM even when a plurality of spot marks SM are congested.

Figure 7:
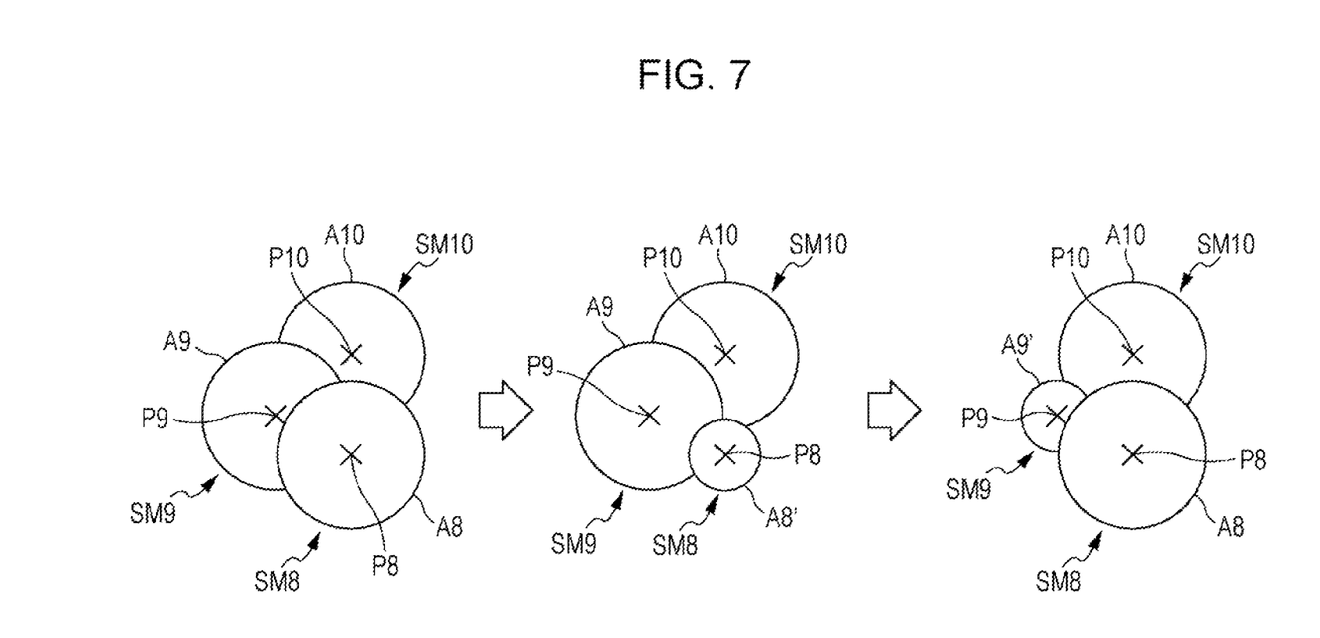
FIG. 7 illustrates processing for adjusting an area of a determination region.

Referring to FIG. 7, processing for adjusting areas of determination regions which are set for three spot marks SM8 to SM10 is described.

In a display example of FIG. 7, a determination region A8 is set by taking a coordinate position P8 of the spot mark SM8 as a center, a determination region A9 is set by taking a coordinate position P9 of the spot mark SM9 as a center, and a determination region A10 is set by taking a coordinate position P10 of the spot mark SM10 as a center. Further, concerning an acquisition order of information of the spots, acquisition of the information of the spot mark SM8 is the last, the information of the spot mark SM9. Is acquired before that of the spot mark SM8, and the information of the spot mark SM10 is acquired before that of the spot mark SM9. Accordingly, the determination region A8 of the spot mark SM8 is given first preference (set as the nearest layer) and the determination region A9 of the spot mark SM9 is given second preference (Set as the second-nearest layer).

As shown in the left side of FIG. 7, respective areas of the determination region A8, the determination region A9, and the determination region A10 are set to be same as each other before the execution of user's selection.

In a case where a touch position is within the determination region A8, for example, based on coordinate information supplied from the detection unit 27 of the touch panel 21 and showing the touch position, the control unit 25 determines that the spot mark SM8 is selected. In this case, the control unit 25 changes the determination region A8 set for the spot mark SM8 to a determination region A8' of which an area is reduced by taking the coordinate position P8 as a center.

In accordance with the reduced area of the determination region A8' of the spot mark SM8, as shown in the middle part of FIG. 7, the areas of the determination region A9 and the determination region A10 are widen in a manner to correspond to parts on which the determination region A8 has been overlapped with the determination region A9 and the determination region A10. Accordingly, the user can easily select the spot mark SM9 and the spot mark SM10.

Further, when the user moves the touch position and the touch position is within the determination region A9, the control unit 25 determines that the spot mark SM9 is selected based on coordinate information supplied from the detection unit 27 of the touch panel 21 and showing the touch position.

In this case, as shown in the right side of FIG. 7, the control unit 25 changes the determination region A9 set for the spot mark SM9 to a determination region A9' of which an area is reduced by taking a coordinate position P9 as a center. At the same time, the control unit 25 returns the determination region A8' to the determination region A8 having an area before reduction, for the spot mark SM8.

Thus, in the information display device 11, the control unit 25 adjusts an area so that a determination region set for a spot which is selected by a user is narrowed. Accordingly, even if a plurality of spots are congested, each of the spots is easily selected when the user performs fine adjustment of the touch position. That is, the information display device 11 can provide a user interface by which each of congested spots is easily selected and thereby the user can easily display basic information of each of the spots on the basic information display part 33.

In a case of a user interface employed in a personal computer, for example, even if a determination region is set to be small, accurate selection can be performed by using a pointing device, but accurate selection is difficult in an operation which is performed by a finger with respect to the touch panel 21. Accordingly, in the user interface employed in the touch panel 21, it is necessary to set a determination region to be large. In this case, it is effective to perform processing of adjusting the determination region in response to user's selection.

Here, as the processing for adjusting an area of a determination region, an area of a determination region may be narrowed by lowering a preference order of the determination region of a spot which is selected by a user (for example, the determination region of the selected spot is set as the bottom layer to be hidden by other determination regions).

Figure 8:
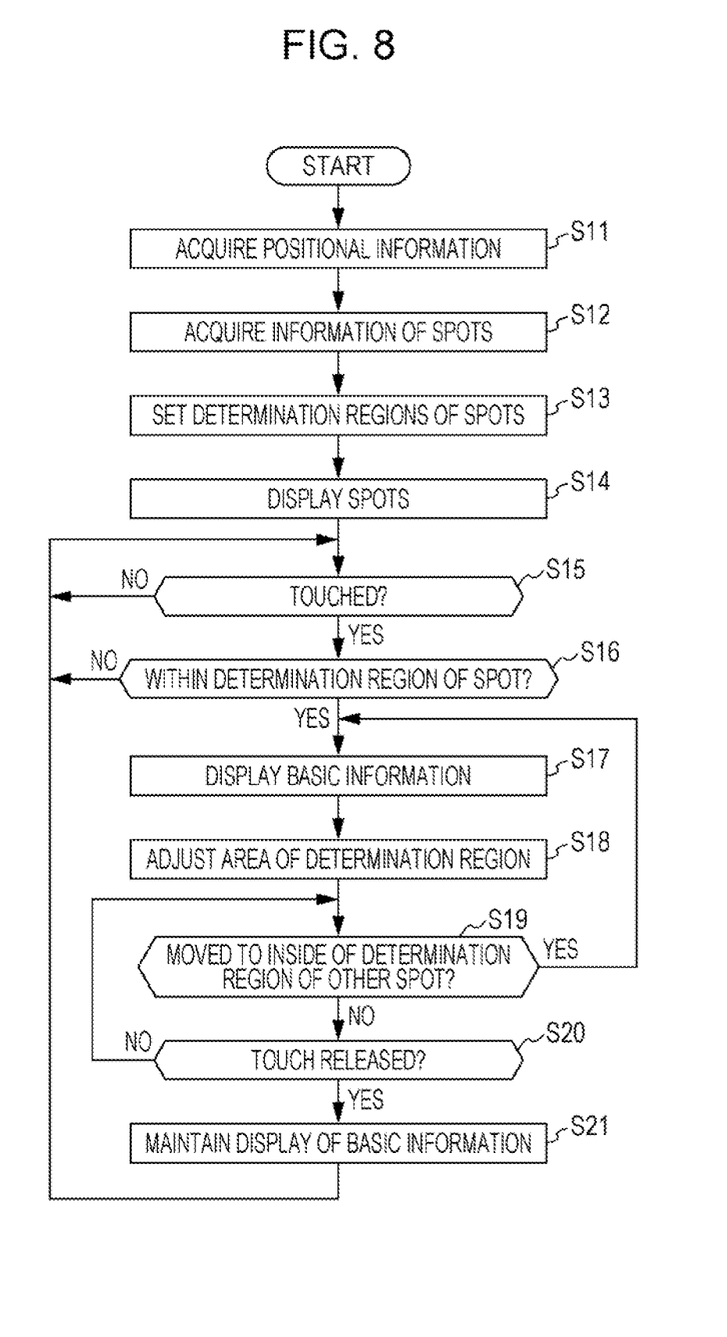
FIG. 8 is a flowchart of processing for displaying a positional relationship of spots existing around a current position.

FIG. 8 is a flowchart of processing that the information display device 11 shown in FIG. 1 displays a positional relationship of spots existing around a current position. For example, when a user operates the information display device 11 and instructs execution of a program for displaying the positional relationship of spots existing around the current position, the processing is started.

In step S11, the control unit 25 controls the positional information acquisition unit 22 so that the positional information acquisition unit 22 acquires a current position of the information display device 11. The positional information acquisition unit 22 specifies the current position of the information display device 11 based on positional information of base stations of wireless LAN as described above in response to the control of the control unit 25 and supplies the information for specifying the current position to the control unit 25. Then, the processing goes to step S12.

In step S12, the control unit 25 supplies the current position of the information display device 11 which is acquired in step S11 to the communication unit 23 and controls the communication unit 23 so that the communication unit 23 acquires information of spots existing around the current position. The communication unit 23 communicates with the server 13 via the network 12 in response to the control of the control unit 25 and acquires information of spots existing around the current position of the information display device 11 so as to supply the information to the control unit 25. The control unit 25 makes a database of the information from the communication unit 23 and stores the database in the storage unit 24.

After the processing of step S12, the processing goes to step S13 in which the control unit 25 sets determination regions (refer to FIG. 7) for respective spots stored in the storage unit 24 in accordance with an order that information of the respective spots are acquired. Then, the processing goes to step S14.

In step S14, the control unit 25 displays the screen 31 in which spot marks SM are displayed in accordance with a distance and a direction set by taking the current position as a center, on the display unit 26 of the touch panel 21 based on the information of the spots stored in the storage unit 24. Further, the central mark 32 and the like are also displayed on the screen 31 as shown in FIG. 2.

After the processing of step S14, the processing goes to step S15 in which the control unit 25 determines whether a user touches the surface of the touch panel 21 and stands by to perform the processing until the control unit 25 determines that the user touches the surface of the touch panel 21. For example, when coordinate information showing a touch position is supplied from the detection unit 27, the control unit 25 determines that the user touches the surface of the touch panel 21.

In a case where it is determined that the user touches the surface of the touch panel 21 in step S15, the processing goes to step S16 in which the control unit 25 determines whether the touch position of the user is within the determination region of the spot.

In step S16, in a case where the control unit 25 determines that the touch position of the user is not within the determination region of the spot, the processing returns to step S15 and similar processing is repeated afterward. That is, the processing is suspended until it is determined that the user touches the inside of the determination region set for the spot mark SM which is displayed on the screen 31.

On the other hand, in a case where the control unit 25 determines that the touch position of the user is within the determination region of the spot in step S16, the processing goes to step S17.

In step S17, the control unit 25 reads out information of the spot that is touched by the user from the database which is stored in the storage unit 24 in step S12, and displays the basic information display part 33 as shown in FIG. 3 based on the information.

After the processing of step S17, the processing goes to step S18 in which the control unit 25 adjusts an area of the determination region set for the spot that is touched by the user. That is, in a case where a plurality of spots are congested and determination regions of these spots are overlapped with each other, the control unit 25 narrows an area of a determination region of a spot which is selected by the user as described with reference to FIG. 7.

After the processing of step S18, the processing goes to step S19 in which the control unit 25 determines whether the touch position of the user is moved to the inside of a determination region set for a spot other than the spot which is determined to be within the determination region in step S16.

In a case where it is determined that the touch position is moved to the inside of a determination region set for other spot in step S19, the processing returns to step S17, and similar processing is repeated afterward. In this case, in step S17, the display of the basic information display part 33 is updated based on information of other spot which is determined as a spot to which the touch position is moved.

On the other hand, in a case where it is determined that the touch position is not moved to the inside of the determination region set for other spot in step S19, the processing goes to step S20.

In step S20, the control unit 25 determines whether the touch of the user is released from the surface of the touch panel 21 or not. For example, when the supply of the coordinate information showing the touch position from the detection unit 27 is stopped, the control unit 25 determines that the touch of the user is released from the surface of the touch panel 21.

In step S20, in a case where the control unit 25 determines that the touch of the user is not released from the surface of the touch panel 21, the processing returns to step S19 and similar processing is repeated afterward. On the other hand, in a case where the control unit 25 determines that the touch of the user is released from the surface of the touch panel 21 in step S20, the processing goes to step S21.

In step S21, the control unit 25 controls the display unit 26 of the touch panel 21 so that the display unit 26 maintains the display of the basic information display part 33 which is currently displayed on the touch panel 21, that is, the display unit 26 continues displaying information of the spot that the user touches last. Accordingly, even if the user releases his/her finger from the surface of the touch panel 21, the display of the information is maintained on the basic information display part 33. After the processing of step S21, the processing returns to step S15 and similar processing is repeated afterward.

As described above, in the information display device 11, information of a spot specified by a spot mark SM which is touched by a user is displayed on the basic information display part 33, and even when a touch position is moved, information displayed on the basic information display part 33 can be updated in accordance with the movement of user's finger. Further, in the information display device 11, even after the user releases his/her finger from the surface of the touch panel 21, last displayed information can be continued to be displayed on the basic information display part 33. Accordingly, information can be provided to a user by a more comfortable operation as described with reference to FIGS. 2 to 5.

Further, in a case where determination regions of a plurality of spots are overlapped with each other, an area of a determination region of a spot which is selected by a user is narrowed, whereby the user can easily select each of the spots and thus operability can be improved.

Here, time during which last displayed information is continued to be displayed on the basic information display part 33 after the user releases his/her finger from the surface of the touch panel 21 may be set and the basic information display part 33 may be hidden after elapse of the time. Accordingly, in a case where the user does not perform an operation with respect to the GUI button 36 or 37, the screen returns to the original screen 31 as shown in FIG. 2, being able to make the user grasp the whole of the screen 31.

Further, the information display device 11 may include a plurality of display units, for example. In this case, spot marks SM arranged in accordance with positional information of spots can be displayed on one display unit and the basic information display part 33 can be displayed on other display unit. Accordingly, reduction of a region, in which arrangement of the spot marks SM is displayed, due to the display of the basic information display part 33 can be prevented.

Further, as the touch panel 21, not only a touch panel which detects only a touch with respect to the front surface thereof but also a touch panel which detects a touch with respect to a rear surface thereof, for example, may be employed. That is, in this case, the user touches the rear surface of the touch panel 21 so as to select a spot mark SM. Accordingly, the screen 31 displayed on the touch panel 21 is not hidden by user's finger, being able to provide more favorable operability. In this case, feedback with respect to the user's operation may be performed by vibrating the information display device 11. Further, the touch panel 21 can detect approach of user's finger (approach to extent that user's finger does not touch the surface of the touch panel 21), and thus detection of a touch with respect to the touch panel 21 includes detection of approach of user's finger to the touch panel 21. Further, the touch panel 21 can detect a touch by something other than a finger, for example, a touch by a stylus (stylus input).

It should be noted that the processing described above with reference to the flowchart is not necessarily executed in a time-series manner corresponding to the order described with the flowchart, and includes processing which is executed in a parallel manner or an individual manner (parallel processing or processing by an object, for example). Further, a program may be processed by one CPU or be subject to distributed processing using a plurality of CPUs.

Further, the control unit 25 of the information display device 11 does not necessarily execute above-described respective processing, but the above-described respective processing may be executed by an information processing device which is not shown, via the network 12, for example. In this case, a processing execution result (the screen 31 displayed on the touch panel 21, for example) may be transmitted to the information display device 11 from the information processing device and be displayed on the touch panel 21. Further, information to be displayed on the basic information display part 33 is not necessarily stored in the storage unit 24 as a database, but may be acquired via the network 12 every time display of information on the basic information display part 33 is updated, for example.

Here, the present technology may employ the following configurations.

(1) An information display device including a display unit configured to display a mark corresponding to a predetermined spot in an arrangement based on positional information of the predetermined spot, a detection unit configured to detect a touch with respect to the display unit so as to specify a touch position showing a position that is touched, and a display control unit configured to perform display control by which information of the mark that is touched is displayed on a part of the display unit based on the touch position when a display part of the mark displayed on the display unit is touched. In the information display device, when a touch is not detected by the detection unit, the display control unit performs display control for maintaining display of the information of the mark that is displayed on the part of the display unit.

(2) The information display device according to (1), in which when a display part of another mark other than the mark corresponding to the information displayed on the part of the display unit is touched, the display control unit updates display on the part of the display unit with information of the other mark in accordance with movement of the touch position.

(3) The information display device according to (1) or (2), in which when a plurality of marks are densely displayed on the display unit, the display control unit adjusts color strength of the marks in accordance with density of the plurality of the marks.

(4) The information display device according to any of (1), (2), and (3), further including, a determination region setting unit configured to set determination regions, which are used for determining that the respective marks are touched, for the respective marks, and an adjustment unit configured such that when the determination regions that are set for the plurality of marks are overlapped with each other and any of the plurality of marks is touched, the adjustment unit narrows an area of the determination region set for the mark that is touched.

It should be understood that embodiments of the present technology are not limited to the embodiment described above and various alterations may occur within the scope of the substance of the present technology. Further, it should be understood that, as used herein, the indefinite articles "a" and "an" mean "one or more" in open-ended claims containing the transitional phrase "comprising," "including," and/or "having."

What is claimed is:

1. A method for displaying information, comprising:
   displaying, on a touch screen, representations of geographic locations by displaying a first indicator representing a first geographic location upon a map, wherein a plurality of indicators are displayed on the touch screen to represent a plurality of geographic locations upon the map;
   detecting a current touch position of a gesture contact being made, by an operating member upon the touch screen, between a plurality of positions on the touch screen that are associated with the plurality of indicators;
   detecting the current touch position as coinciding with a position on the touch screen that is associated with the displayed first indicator;
   displaying, based on the detected coinciding of the current touch position with the position on the touch screen that is associated with the displayed first indicator and concurrently with the displaying of the first indicator, information associated with the first geographic location;

detecting a moving of the current touch position along a path of the gesture contact and detecting the moved current touch position to coincide with a second position on the touch screen that is associated with a second displayed indicator representing a second geographic location upon the map;

displaying, based on the detected coinciding of the moved current touch position with the position on the touch screen that is associated with the displayed second indicator and concurrently with the displaying of the second indicator, information associated with the second geographic location;

displaying, when the moving of the current touch position along the path of the gesture contact is detected to have further moved from the position on the touch screen that is associated with the displayed second indicator and to coincide with a subsequent position on the touch screen that is associated with a subsequent displayed indicator representing a subsequent geographic location upon the map, information associated with the subsequent geographic location, based on the detected coinciding of the moved current touch position with the position on the touch screen that is associated with the displayed subsequent indicator and concurrently with the displaying of the subsequent indicator;

maintaining display of information associated with the geographic location whose representing indicator is last detected in time to coincide in position with the moved current touch position as the current touch position moves along the path of the gesture contact; and detecting removal of the operating member from contacting the touch screen, wherein the displaying of the information is also maintained after detection of the removal of the operating member from contacting the touch screen.

2. The method of claim 1, wherein the method further comprises:
displaying, on the touch screen, a graphic identifying a device location.

3. The method of claim 2, wherein the method further comprises:
displaying, on the touch screen, distance information and direction information;
the distance information identifying a distance between the device location and the geographic location whose representing indicator is last detected in time to coincide in position with the moved current touch position; and
the direction information identifying a direction of the geographic location whose representing indicator is last detected in time to coincide in position with the moved current touch position, with respect to the device location.

4. The method of claim 1, wherein the information associated with respective geographic locations comprises at least one of an information category, a name of the geographic location; or an address of the respective geographic location.

5. The method of claim 1, wherein the information associated with respective geographic locations is displayed on a respective portion of the touch screen, the respective portion comprising at least one input area.

6. The method of claim 5, wherein the method further comprises:
displaying, upon detecting contact between the operating member and the input area, an image associated with the respective geographic location.

7. The method of claim 5, wherein the method further comprises:
displaying, upon detecting contact between the operating member and the input area, a route to the respective geographic location.

8. The method of claim 5, wherein the method further comprises:
displaying, upon detecting contact between the operating member and the input area, a map; and
wherein the representations are displayed in substantially a center of the map.

9. The method of claim 1, wherein color saturations of the representations are based on a density of the representations.

10. The method of claim 1, wherein:
the moved current touch position is detected to coincide with the second positon on the touch screen while the information associated with the first geographic location is being displayed.

11. The method of claim 10, wherein the method further comprises:
defining a first region of the touch screen, the first region corresponding to the first geographic location;
defining a second region of the touch screen, the second region corresponding to the second geographic location;
assigning, if the first and second regions overlap, a first preference level to the first region and a second preference level to the second region;
displaying the information associated with the first geographic location if:
the detected current touch position position is within the first region and outside of the second region; or
the detected current touch position is within the first and second regions, and the first preference level is higher than the second preference level; and
shrinking, if the information associated with the first geographic location is being displayed, the first region.

12. The method of claim 11, wherein the method comprises:
maintaining, if the detected current position is outside of the first and second regions, display of the information associated with the first geographic location; and
displaying the information associated with the second geographic location if:
the detected current position is within the second region and outside of the first region; or
the detected current position is within the first and second regions, and the second preference level is higher than the first preference level.

13. The method of claim 10, wherein the operating member makes, as one continuous touch gesture over a period of time, the gesture contact moving between the plurality of positions on the touch screen that are associated with the plurality of indicators.

14. An apparatus for displaying information, the apparatus comprising:
a memory; and
a processor executing instructions stored in the memory to:
generate signals for displaying, on a touch screen, representations of geographic locations by displaying a first indicator representing a first geographic location upon a map,
wherein a plurality of indicators are displayed on the touch screen to represent a plurality of geographic locations upon the map;
detect a current touch position of a gesture contact being made, by an operating member upon the touch screen, between a plurality of positions on the touch screen that are associated with the plurality of indicators;

detect the current touch position as coinciding with a position on the touch screen that is associated with the displayed first indicator;

generate signals for displaying, based on the detected coinciding of the current touch position with the position on the touch screen that is associated with the displayed first indicator and concurrently with the displaying of the first indicator, information associated with the first geographic location;

detect a moving of the current touch position along a path of the gesture contact and detect the moved current touch position to coincide with a second position on the touch screen that is associated with a second displayed indicator representing a second geographic location upon the map;

display, based on the detected coinciding of the moved current touch position with the position on the touch screen that is associated with the displayed second indicator and concurrently with the displaying of the second indicator, information associated with the second geographic location;

display, when the moving of the current touch position along the path of the gesture contact is detected to have further moved from the position on the touch screen that is associated with the displayed second indicator and to coincide with a subsequent position on the touch screen that is associated with a subsequent displayed indicator representing a subsequent geographic location upon the map, information associated with the subsequent geographic location, based on the detected coinciding of the moved current touch position with the position on the touch screen that is associated with the displayed subsequent indicator and concurrently with the displaying of the subsequent indicator;

maintain display of information associated with the geographic location whose representing indicator is last detected in time to coincide in position with the moved current touch position as the current touch position moves along the path of the gesture contact; and detect removal of the operating member from contacting the touch screen, wherein the display of the information is also maintained after detection of the removal of the operating member from contacting the touch screen.

15. The apparatus of claim 14, wherein the processor executes further instructions stored in the memory to:

generate signals for displaying, on the touch screen, a graphic identifying a device location.

16. The apparatus of claim 15, wherein the processor further executes instructions stored in the memory to:

generate signals for displaying, on the touch screen, distance information and direction information;

the distance information identifying a distance between the device location and the geographic location whose representing indicator is last detected in time to coincide in position with the moved current touch position; and the direction information identifying a direction of the geographic location whose representing indicator is last detected in time to coincide in position with the moved current touch position, with respect to the device location.

17. The apparatus of claim 14, wherein the information associated with respective geographic locations is displayed on a respective portion of the touch screen, the respective portion comprising at least one input area.

18. The apparatus of claim 17, wherein the processor executes further instructions stored in the memory to:

generate signals for displaying, upon detecting contact between the operating member and the input area, an image associated with the respective geographic location.

19. A non-transitory, computer-readable storage medium storing instructions which, when executed by a computer, causes the computer to execute a method of displaying information, the method comprising:

displaying, on a touch screen, representations of geographic locations by displaying a first indicator representing a first geographic location upon a map, wherein a plurality of indicators are displayed on the touch screen to represent a plurality of geographic locations upon the map;

detecting a current touch position of a gesture contact being made, by an operating member upon the touch screen, between a plurality of positions on the touch screen that are associated with the plurality of indicators;

detecting the current touch position as coinciding with a position on the touch screen that is associated with the displayed first indicator;

displaying, based on the detected coinciding of the current touch position with the position on the touch screen that is associated with the displayed first indicator and concurrently with the displaying of the first indicator, information associated with the first geographic location;

detecting a moving of the current touch position along a path of the gesture contact and detecting the moved current touch position to coincide with a second position on the touch screen that is associated with a second displayed indicator representing a second geographic location upon the map;

displaying, based on the detected coinciding of the moved current touch position with the position on the touch screen that is associated with the displayed second indicator and concurrently with the displaying of the second indicator, information associated with the second geographic location;

displaying, when the moving of the current touch position along the path of the gesture contact is detected to have further moved from the position on the touch screen that is associated with the displayed second indicator and to coincide with a subsequent position on the touch screen that is associated with a subsequent displayed indicator representing a subsequent geographic location upon the map, information associated with the subsequent geographic location, based on the detected coinciding of the moved current touch position with the position on the touch screen that is associated with the displayed subsequent indicator and concurrently with the displaying of the subsequent indicator;

maintaining display of information associated with the geographic location whose representing indicator is last detected in time to coincide in position with the moved current touch position as the current touch position moves along the path of the gesture contact; and detecting removal of the operating member from contacting the touch screen, wherein the displaying of the information is also maintained after detection of the removal of the operating member from contacting the touch screen.

20. The non-transitory computer-readable storage medium of claim 19, wherein the information associated with respective geographic locations is displayed on a respective portion of the touch screen, the respective portion comprising at least one input area.

21. The non-transitory computer-readable storage medium of claim 20, wherein the method further comprises: displaying, upon detecting contact between the operating member and the input area, an image associated with the respective geographic location.

* * * * *